United States Patent [19]

Morris

[11] Patent Number: 5,162,792
[45] Date of Patent: Nov. 10, 1992

[54] ON-THE-FLY ARRANGEMENT FOR INTERCONNECTING LEADS AND CONNECTORS

[75] Inventor: Robert J. T. Morris, Holmdel, N.J.

[73] Assignee: American Telephone and Telegraph Company, New York, N.Y.

[21] Appl. No.: 562,291

[22] Filed: Aug. 3, 1990

[51] Int. Cl.⁵ .............................................. H04Q 1/00
[52] U.S. Cl. ............................ 340/825.79; 358/101
[58] Field of Search .................. 340/825.79, 825.52; 358/101; 382/8; 364/474.35, 474.36; 361/395, 404, 410, 412; 439/43, 49, 50, 510; 29/868, 869, 871, 560; 324/66, 539

[56] References Cited

U.S. PATENT DOCUMENTS

| | | | |
|---|---|---|---|
| 4,249,303 | 2/1981 | Weinmann et al. | 29/868 |
| 4,259,778 | 4/1981 | Greenwood | 29/560 |
| 4,278,538 | 7/1981 | Lawrence et al. | 209/580 |
| 4,489,364 | 12/1984 | Chance et al. | 361/395 |
| 4,543,716 | 10/1985 | Damiano et al. | 29/871 |
| 4,584,766 | 4/1986 | Ogawa et al. | 324/66 |
| 4,631,698 | 12/1986 | Walsh et al. | 340/825.16 |
| 4,636,847 | 1/1987 | Magi et al. | 358/101 |
| 4,652,974 | 3/1987 | Ryan | 361/395 |
| 4,710,592 | 12/1989 | Kimbara | 174/68.5 |
| 4,731,663 | 3/1988 | Kovalchick et al. | 358/101 |
| 4,803,595 | 2/1989 | Kraus et al. | 361/412 |
| 4,875,139 | 10/1989 | Fukui | 361/410 |
| 4,912,603 | 3/1990 | Seyama | 361/409 |

OTHER PUBLICATIONS

Hojaboom et al., "Color Detection System" IBM Technical Disclosure Bulletin, vol. 19, No. 12, May 1977, pp. 4552-4553.

Primary Examiner—Palmer C. DeMeo
Assistant Examiner—Edwin C. Holloway, III

[57] ABSTRACT

An arrangement is provided to correlate random connections made at one end of a multiwire cable with connections that are to made at the opposite end of the cable, in which the different leads of the cable are usually separated, for example, by a distinctive color pattern. The arrangement includes identifying the respective leads by a distinguishing marking, connecting a first end of the leads to a first connector, sensing the distinguishing marking of the lead connected to each contact of the first connector, and, responsive to the first end distinguishing marking, generating a first order identifying signal. The arrangement also includes identifying the respective leads by a distinguishing marking at a second end of the leads, sensing the distinguishing marking of each lead at the second end of the leads, responsive to the second end distinguishing marking, generating a second order identifying signal, responsive to the first and the second order identifying signals, generating a crossover matrix, which correlates the first and the second ends of the leads, responsive to the crossover matrix, generating a crossover network, and inserting the crossover network in a second connector for establishing connectivity between the first and the second connectors. The arrangement may also include generating the crossover network by selecting a crossover network from a plurality of prefabricated crossover networks or, alternatively, fabricating a crossover network.

6 Claims, 3 Drawing Sheets

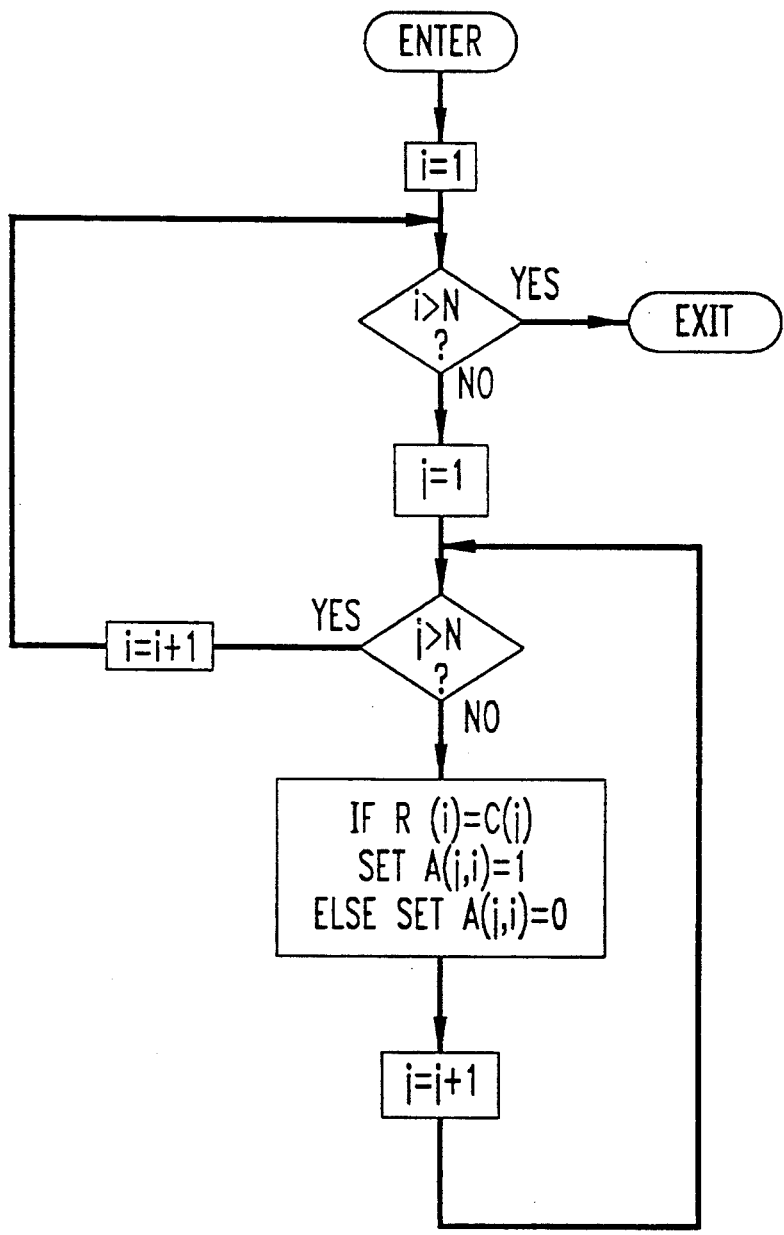

ON-THE-FLY ARRANGEMENT FOR INTERCONNECTING LEADS AND CONNECTORS

BACKGROUND OF THE INVENTION

1. Technical Field

This invention relates to interconnection arrangements and, more particularly, to an arrangement for interconnecting leads and connectors.

2. Description of the Prior Art

The art related to the connection of a cable, which includes a plurality of wires, or leads, to a connector, which includes a plurality of contacts, typically includes at least three phases, or stages. The first stage usually involves sorting or separating the different leads. In some applications each lead of a cable may have a distinctive color pattern or some other distinguishing marking. In that manner it becomes easier to sort the plurality of wires, for example, by arranging the wires by color pattern into some sorted order such that the leads may be readily interconnected to predetermined ones of the contacts in a connector. The second stage usually involves checking the order of the sorted leads. U.S. Pat. No. 4,731,663, which issued on Mar. 15, 1988 to J. S. Kovalchick et al. and which is entitled "Method and Apparatus for Color Identification", discloses an arrangement for determining the color of each of a plurality of wires, or leads. Advantageously, the arrangement of the '663 patent can be used to check the order of the sorted leads of a cable. The third stage usually involves the actual connection, for example, by bonding or crimping or spiking of leads and contacts.

The first stage, even with today's automated technology, tends to remain a labor intensive, manual process. Accordingly, the second (checking) stage continues to be used, in some measure, due to the inaccuracies that are typically introduced in the manual first stage. Commonly noted first stage inaccuracies are the type introduced due to operator boredom and eyestrain as well as difficulties in distinguishing small differences in hue.

SUMMARY OF THE INVENTION

This and other problems are solved in accord with the principles of my invention which includes a method and a system for interconnecting leads and connectors. The arrangement includes identifying the respective leads by a distinguishing marking, connecting a first end of the leads to a first connector, sensing the distinguishing marking of the lead connected to each contact of the first connector, and, responsive to the first end distinguishing marking, generating a first order identifying signal. The arrangement also includes identifying the respective leads by a distinguishing marking at a second end of the leads, sensing the distinguishing marking of each lead at the second end of the leads, responsive to the second end distinguishing marking, generating a second order identifying signal, responsive to the first and the second order identifying signals, generating a crossover matrix, which correlates the first and the second ends of the leads, responsive to the crossover matrix, generating a crossover network, and inserting the crossover network in a second connector for establishing connectivity between the first and the second connectors. The arrangement may also include generating the crossover network by selecting a crossover network from a plurality of prefabricated crossover networks or, alternatively, fabricating a crossover network.

BRIEF DESCRIPTION OF THE DRAWINGS

My invention should become more apparent from the following detailed description when taken in conjunction with the accompanying drawing in which:

FIG. 4 is a flow chart illustrating a methodology in generating a crossover matrix in accord with the principles of my invention.

DETAILED DESCRIPTION

Figure 1:
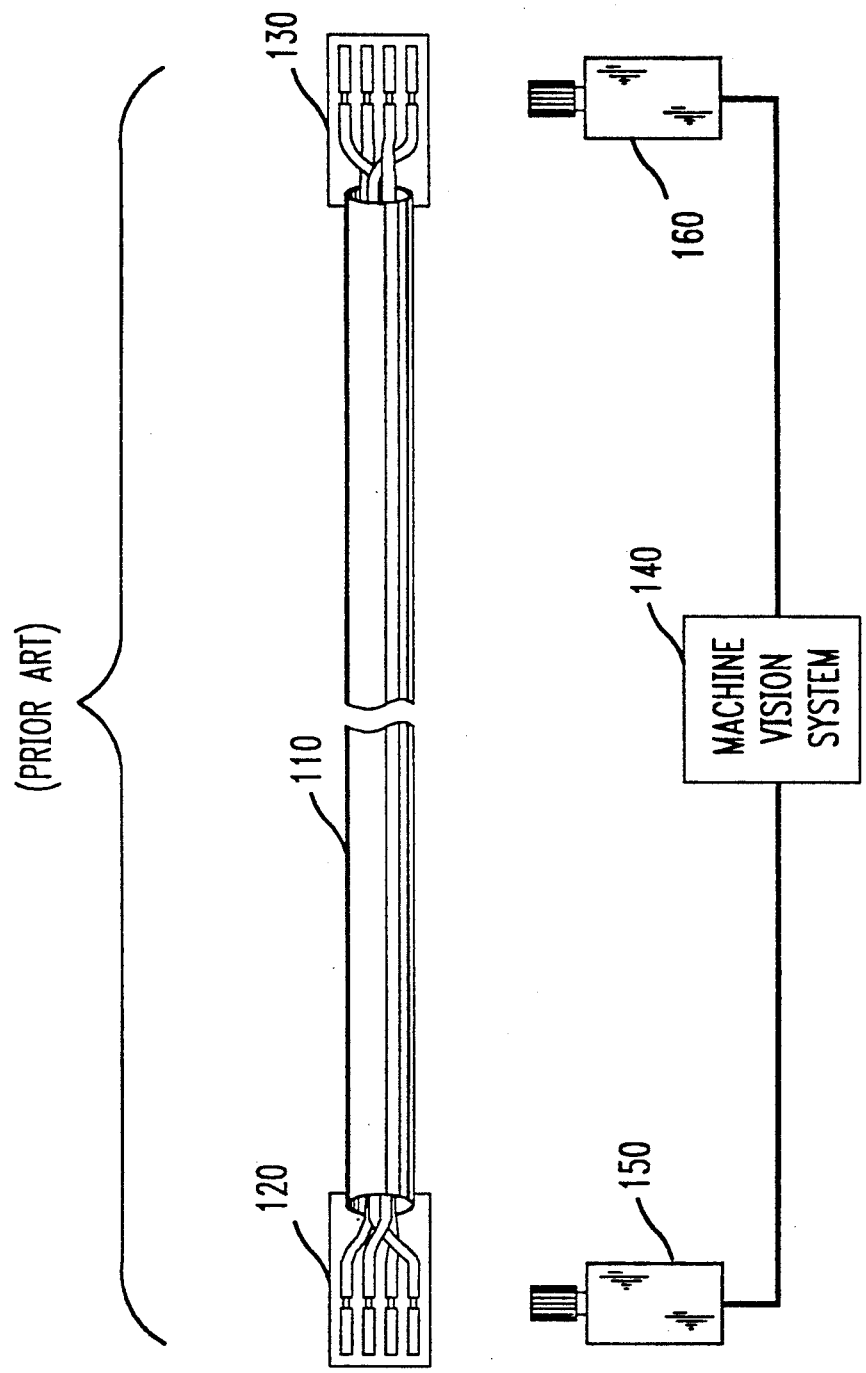
FIG. 1 is a block diagram illustrating a prior art cable, connectors, and lead and contact checking system.

Referring to FIG. 1, there is illustrated a prior art arrangement for interconnecting leads and connectors. Cable 110 includes a plurality of leads, which need to be interconnected in some defined order with the contacts that comprise connectors 120 and 130. The end result is that the respective contacts of connector 120 become interconnected in the defined order with the corresponding respective contacts of connector 130. Once so interconnected, then an electrical connectivity can exist between the corresponding two contacts of connectors 120 and 130. The term "connectivity" as used herein will have the foregoing meaning. One common way to embody the first stage separation process in order to achieve connectivity is to have a red lead always be connected to a first contact in each of connectors 120 and 130 and to have a green lead always connected to a second contact in each of connector et cetera. Generally upon completing the first stage, the second stage checking process is embarked upon. Indeed, in the checking phase, it is common to check that the leads are in the defined order prior to embarking upon the third stage, i.e. the actual connection. Hence, the checking is commonly done prior to the bonding or crimping or spiking of leads and contacts. This has a further advantage of improving the quality control process.

One way for checking the order of the leads is disclosed in the cited U.S. Pat. No. 4,731,663. There and in my FIG. 1, an assembly of video cameras 150 and 160 can be coupled to machine vision system 140, which can be suitably programmed to perform the lead/connector checking methodology and to signal a user or other apparatus of the results of the checking methodology.

Figures 2, 3:
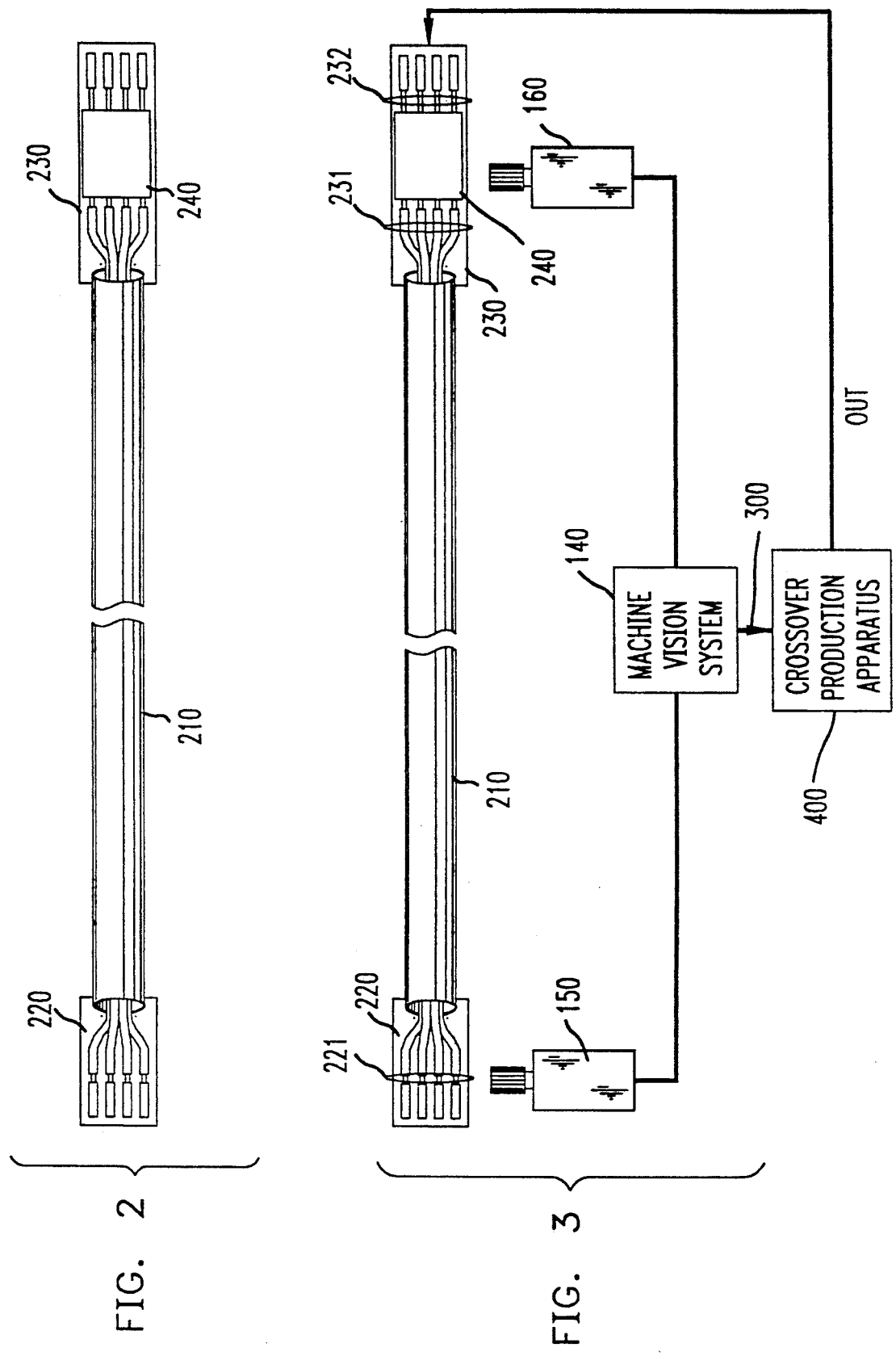
FIG. 2 is a block diagram illustrating the insertion of a crossover network in accord with the principles of my invention.
FIG. 3 is a block diagram illustrating a system in accord with the principles of my invention.

Referring to FIG. 2, there is also illustrated an arrangement for interconnecting leads and connectors. Cable 210 (like with cable 110) includes a plurality of leads, which need to be interconnected in some defined order with the contacts that comprise connectors 220 and 230 (like with connectors 120 and 130). The end result is that the respective contacts of connector 220 become interconnected in the defined order with the corresponding respective contacts of connector 230. However, in accordance with the principles of my invention, it is not necessary to have a red lead always be connected to a first contact in each connector nor is it necessary to have a green lead always connected to a second contact in each connector, et cetera. Rather, using the principles of my invention, crossover network 240 may be suitably selected on-the-fly from a set of prefabricated crossover networks or may be fabricated on-the-fly and included in either or both of connectors 220 and 230 to accomplish the desired connectivity. The term "on-the-fly" refers to the process of producing the crossover network then and there as it is needed and without waiting an undue period of time before the crossover network becomes available.

For purposes of illustration and not by way of limitation, cable 210 includes a plurality of leads, which may be actually connected to either connector 220 or connector 230. Assume here that the leads of one end of cable 210 are connected to the contacts of connector 220 in any order-indeed even in a random order. By using the principles of my invention, the uncertainties of a random ordering of leads to contacts can be abolished. Crossover network 240 can be selected or fabricated to accomplish the desired connectivity, notwithstanding the order of connection of leads to contacts in connector 220.

Referring now to FIG. 3, there is illustrated a combination of certain elements from FIGS. 1 and 2 as well as certain new elements, e.g. crossover producer 400 for producing crossover network 240.

Paralleling the earlier description, cable 210 includes a plurality of leads, which need to be interconnected in some order with the contacts that comprise connectors 220 and 230. Leads 221 at one end of cable 210 may be connected to the contacts of connector 220 in any order even a random order. Once the leads 221 are actually connected by bonding or crimping or spiking, among other ways, to the contacts of connector 220, a problem remains as to establishing connectivity between the contacts of connector 220 and the contacts of connector 230.

For purposes of this illustrative description, let there be N leads 221 where N is an integer. Also, let there be N contacts in connector 220. Further, let the N leads 221 be connected to the N contacts in connector 220 to establish a one-to-one correspondence between the N leads and the N contacts. So much for one end of the assemblage.

Leads 231 at the other end of cable 210 may be extended, i.e. electrically connected, through crossover network 240 such that crossover network 240 extends leads 231 to the contacts of connector 230 in such a manner that the contacts of connector 230 are electrically mated with the contacts of connector 220, i.e. so that connectivity exists between the respective contacts of the respective connectors.

Continuing with a description of FIG. 3, assume that the respective leads of cable 210 have respectively distinguishing markings, for example, distinctive colors, as a means for identifying the different leads. On the one hand, responsive to the respective colors, the respective leads may be sorted, if that is desired, prior to being connected to the contacts of connector 220. On the other hand, the respective leads may be randomly connected to the contacts of connector 220. Further, any of a variety of other scenarios may be followed for associating the leads 221 to the contacts of connector 220. And, notwithstanding the particular associating scenario actually used, the color of each of the plurality of leads 221 may be extended from video camera assembly 150 to machine vision system 140, for example, by using the technology disclosed in the aforecited U.S. Pat. No. 4,731,663. Similarly, camera assembly 160 can extend the color of each of the plurality of leads 231 to machine vision system 140. Responsive to the order of the leads 221 to connector 220, as evidenced by the color signals from video camera assembly 150, and responsive to the order of the leads 231 to connector 230, as evidenced by the color signals from video camera assembly 160, machine vision system 140 extends first and second order identifying signals to crossover producer 400.

To assist in understanding the process of crossover producer 400, let R be a vector of N elements where each element R(i) identifies the distinguishing marking, for example, the color of that one of leads 221, which is connected to the i-th contact of connector 220. Note that the R vector can be characterized as a first order identifying signal in that its elements R(i) as i=1 to N identify in order the color of the lead connected to the respective contacts of connector 220. Also, let C be a vector also of N elements where each element C(j) identifies the distinguishing marking, for example, the color of that one of leads 231, which is to be connected to the j-th input of crossover network 240. Note also that the C vector can be characterized as a second order identifying signal in that its elements C(j) as j=1 to N identify in order the color of the lead connected to the respective inputs of crossover network 240.

Crossover network 240 can be generated by crossover producer 400, responsive to a first order identifying vector (R) and to a second order identifying vector (C). Crossover producer embodies the methodology illustrated in FIG. 4. For example, crossover producer 400 generates a N×N crossover matrix symbolized as A with elements A(m,n) either equal to the integer one if a crossover, i.e., a connection, is to be made between the m-th lead of leads 231 and the n-th contact of connector 230 or equal to zero otherwise. As shown in FIG. 4, in the event that R(i) equals C(j), which means that the two distinguishing markings are the same, a crossover or connection is to be made between the j-th lead and the i-th contact, i.e. A(j,i)=1. In the event that R(i) does not equal C(j), which means that the two distinguishing markings are different, no crossover or connection is to be made between the j-th lead and the i-th contact, i.e. A(j,i)=0. In that manner, the connection of leads 221 and contacts in connector 220, whether random or otherwise, and the connection of leads 231 as an input to crossover network 240, whether random or otherwise, can be adjusted or compensated or equalized by crossover network 240, which comprises the interconnect pattern represented by crossover matrix A.

In response to crossover matrix A, crossover producer 400 produces crossover network 240 on-the-fly.

In a first embodiment of crossover producer 400, for example, an embodiment that includes four leads, it may be noted that there are 24 permutations of the four leads. That means that there are 24 different possible crossover networks 240. A prefabricated supply of the 24 possible configurations of a crossover network may be manufactured and available for use. Since each crossover matrix A corresponds to one of the 24 possible prefabricated crossover network configurations, a specific one of the 24 crossover networks may be selected and embodied in connector 230 in response to the specific crossover matrix A that is produced.

In a second embodiment of crossover producer 400, for example, an embodiment in which a crossover network may be fabricated in response to, and even, for example, at the time of generating, the crossover matrix A. For example, a N×N crossover network could be fabricated using double-sided printed wiring board technology with N×N plated through holes. Then at the time of fabrication, the N×(N−1) holes where connections are not desired could be drilled or punched out. Alternatively, the connectivity provided by plated through holes could be replaced with an anisotropically conductive polymer contacting a copper pattern on two sheets of printed wiring board. Again, at the time of fabrication, the $N \times (N-1)$ holes where connections are not desired could be drilled or punched out.

Although the invention has been described and illustrated in detail, it is to be understood that the above description is presented primarily for the purpose of illustration and example. For brevity, only some alternatives for generating the crossover network have been described. Still other alternatives, for example, other methods using contacts which are impressed, pierce or otherwise allow electrical connection to be made and other variations of the principles of the invention will occur to those skilled in the art. Furthermore and again for brevity, only one example of a methodology to sense the order of the connection of leads to contacts has been described, namely the assembly of video cameras 150 and 160 together with machine vision system 140. In an alternative embodiment, the sensing could be carried out by an electrical continuity testing arrangement applied to connectors 220 and 230. Accordingly, the invention is not limited by the embodiments shown and described, but only by the appended claims.

I claim:

1. A method for interconnecting leads and connectors, the method including identifying the respective leads by a distinguishing marking, connecting a first end of the leads to a first connector, sensing the distinguishing marking of the lead connected to each contact of the first connector, and, responsive to the first end distinguishing marking, generating a first order identifying signal and wherein the improvement comprises the steps of:

identifying the respective leads by a distinguishing marking at a second end of the leads, sensing the distinguishing marking of each lead at the second end of the leads, responsive to the second end distinguishing marking, generating a second order identifying signal, responsive to the first and the second order identifying signals, generating a crossover matrix, which correlates the first and the second ends of the leads, responsive to the crossover matrix, generating a crossover network, and disposing the crossover network between the second end of the leads and contacts of a second connector for establishing connectivity between the first and the second connectors.

2. The method defined in claim 1 wherein the crossover network generating step comprises the step of:

selecting a crossover network from a plurality of prefabricated crossover networks.

3. The method defined in claim 1 wherein the crossover network generating step comprises the step of:

fabricating a crossover network.

4. A system for interconnecting leads and connectors, the system including means for identifying the respective leads by a distinguishing marking, means for connecting a first end of the leads to a first connector, means for sensing the distinguishing marking of the lead connected to each contact of the first connector, and means, responsive to first end distinguishing marking, for generating a first order identifying signal and wherein the improvement comprises:

means for identifying the respective leads by a distinguishing marking at a second end of the leads, means for sensing the distinguishing marking of each lead at the second end of the leads, means, responsive to the second end distinguishing marking, for generating a second order identifying signal, means, responsive to the first and the second order indentifying signals, for generating a crossover matrix, which correlates the first and the second ends of the leads, means, responsive to the crossover matrix, for generating a crossover network, and means for disposing the crossover network between the second end of the leads and a second connector for establishing connectivity between the first and the second connectors.

5. The system defined in claim 4 wherein the crossover network generating means comprises:

means for selecting a crossover network from a plurality of prefabricated crossover networks.

6. The system defined in claim 4 wherein the crossover network generating means comprises:

means for fabricating a crossover network.

* * * * *